No. 750,229. PATENTED JAN. 19, 1904.
J. S. SHEPPARD.
SHAFT REVERSING MECHANISM.
APPLICATION FILED MAY 20, 1903.
NO MODEL. 3 SHEETS—SHEET 1.

WITNESSES: INVENTOR:
F. J. Hartman John S. Sheppard,
Walter C. Pusey. BY Joshua Pusey.
ATTORNEY.

No. 750,229. PATENTED JAN. 19, 1904.
J. S. SHEPPARD.
SHAFT REVERSING MECHANISM.
APPLICATION FILED MAY 20, 1903.
NO MODEL. 3 SHEETS—SHEET 2.

WITNESSES:
F. J. Hartman
Walter C. Pusey

INVENTOR:
John S. Sheppard,
BY Joshua Pusey.
ATTORNEY.

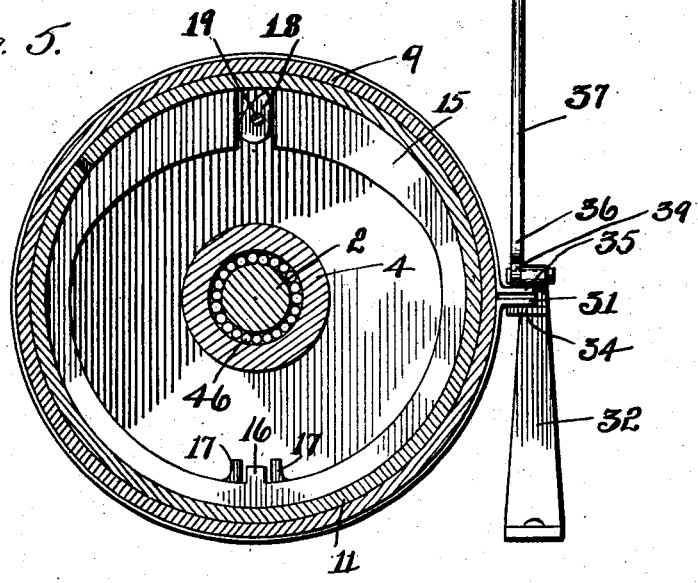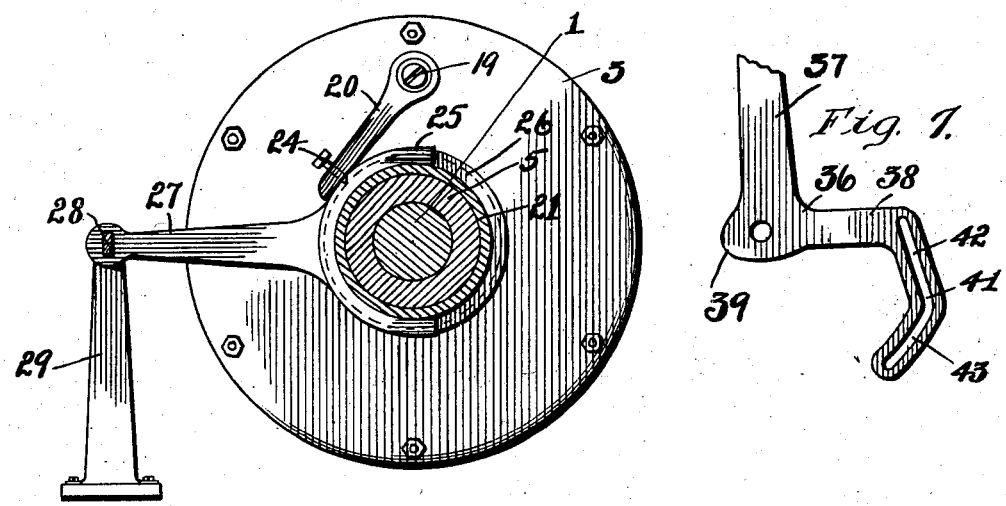

No. 750,229. Patented January 19, 1904.

UNITED STATES PATENT OFFICE.

JOHN S. SHEPPARD, OF ESSINGTON, PENNSYLVANIA.

SHAFT-REVERSING MECHANISM.

SPECIFICATION forming part of Letters Patent No. 750,229, dated January 19, 1904.

Application filed May 20, 1903. Serial No. 157,907. (No model.)

*To all whom it may concern:*

Be it known that I, JOHN S. SHEPPARD, a citizen of the United States, residing at Essington, in the county of Delaware, State of Pennsylvania, have invented certain new and useful Improvements in Shaft-Reversing Mechanisms, of which the following is a full, clear, and exact description, reference being had to the accompanying drawings, of which—

Figure 1:
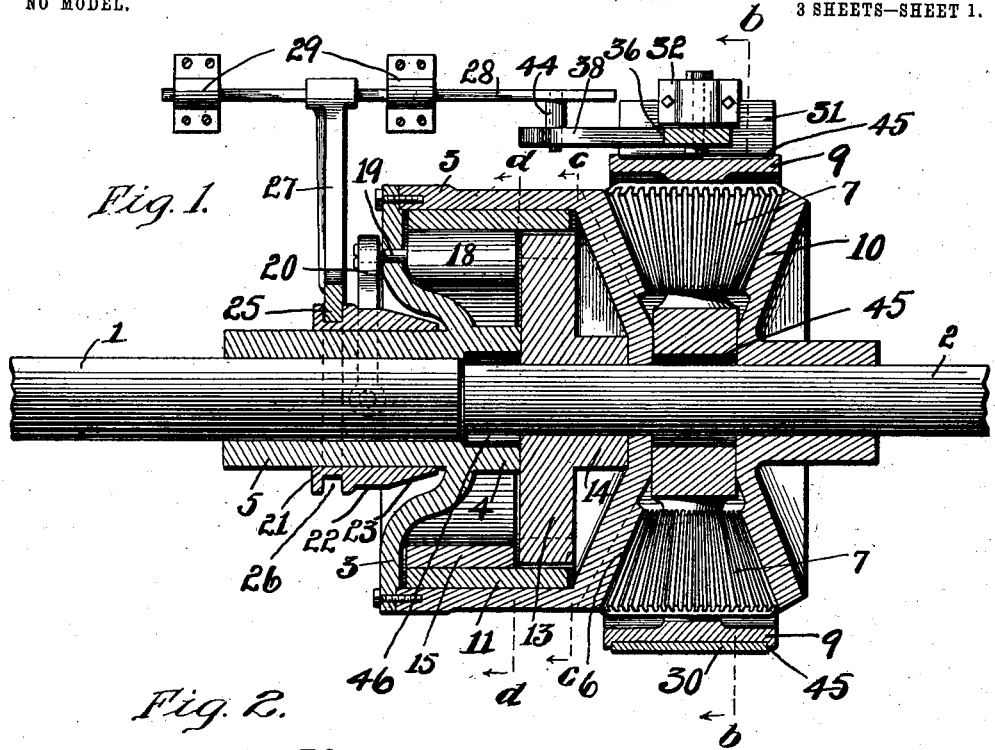
Figure 2:
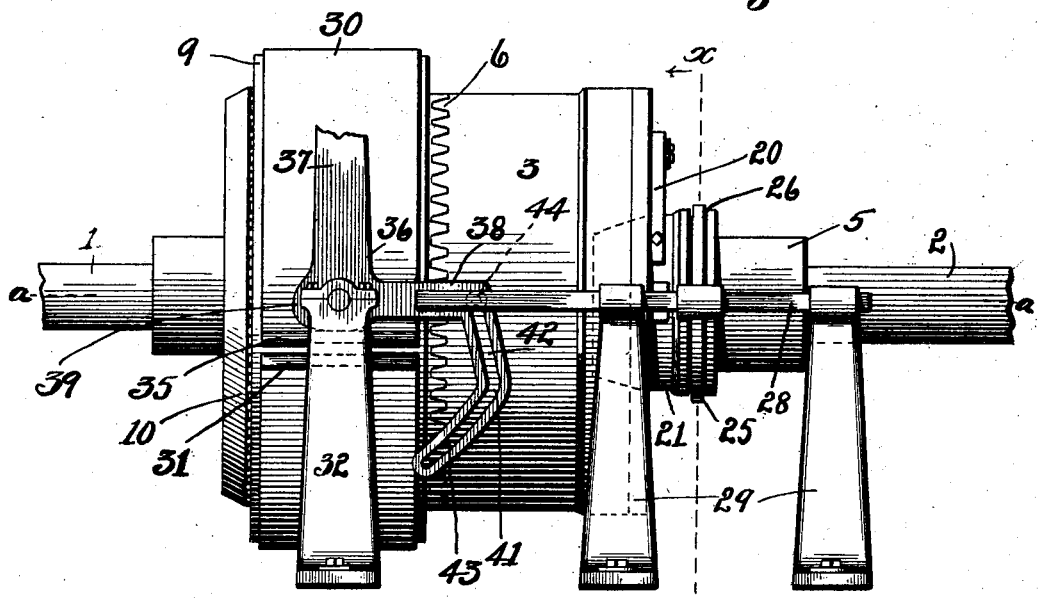
Figure 3:
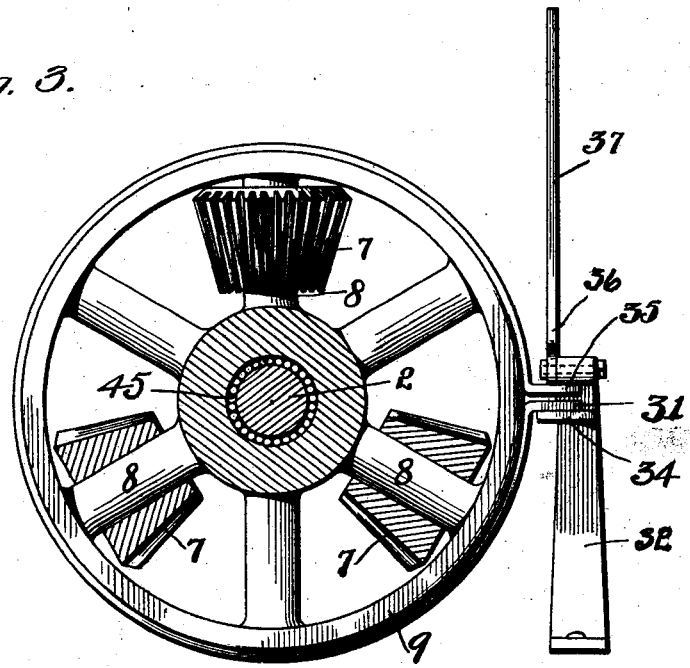
Figure 4:
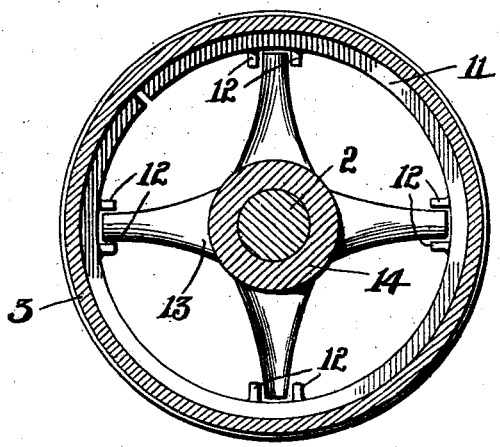

Figure 1 is a sectional plan view as on the line $a\ a$, Fig. 2. Fig. 2 is a side elevation. Fig. 3 is a full vertical section on line $b\ b$, Fig. 1. Fig. 4 is a similar section on line $c\ c$ Fig. 1. Fig. 5 is a similar section on line $d\ d$, Fig. 1. Fig. 6 is a vertical section on line $x\ x$, Fig. 2. Fig. 7 is a detail of the cam-lever detached.

This invention has for its object the production of an improved shaft-reversing mechanism more especially for use in connection with propeller-shafts for boats.

The invention comprises certain combinations of mechanism and devices hereinafter particularly described and pointed out, whereby the tail-shaft may be driven in the same direction or in the opposite direction to that of the driving-shaft or not driven at all, while the direction of the driving-shaft remains unchanged.

Referring to the accompanying drawings, in which the parts are shown in the position occupied when the tail-shaft is driven in the same direction as the driving-shaft, 1 is the driving-shaft, and 2 the tail-shaft, in line therewith. Firmly mounted upon the end portion of the driving-shaft is a hollow cylindrical frame or support, hereinafter referred to as the "cylinder" 3, into which extends the tail-shaft 2, as clearly seen in Fig. 1. The said shafts are adapted to run in suitable bearings, (not shown,) and the tail-shaft has also a bearing in a tubular extension 4 of the hub 5 of said cylinder 3. Secured to or it may be integral with the outer part of the forward end of the said cylinder is a bevel-gear 6, which gear engages bevel-gears 7—three in the present instance—that are rotatably mounted upon equidistant radial shafts or spokes 8 of a rimmed wheel 9. This wheel is rotatably mounted upon the tail-shaft, and the bevel-gears 7 engage a bevel-gear 10, similar to gear 6, that is secured to the tail-shaft.

Within and contiguous to the inner periphery of the cylinder 3 is an elastic split ring or friction-ring 11, of bronze or other suitable material, having inwardly-projecting lugs 12 in sets of two, (four sets in this instance,) between which lugs respectively project the free ends of spokes of a spider 13, whose hub 14 is fixed to the tail-shaft 2, there being a suitable space between the ends of said spokes and said friction-ring. Thus obviously while the latter will be carried around by the rotation of the tail-shaft it is free to expand or contract, as the case may be, under circumstances hereinafter described. Within and contiguous to the ring 11 is a similar elastic friction-ring 15, that is adapted to rotate with the driving-shaft 1, the ring having an inwardly-projecting lug 16, extending between two lugs 17 of an end of the cylinder 3, which latter, it will be remembered, is secured to the driving-shaft.

Within the space between the free ends of the friction-ring 15 is a cam 18, Fig. 5, which is mounted on a rock-shaft 19, Figs. 5 and 6, that passes through and is journaled in the said end of cylinder 3. Fastened to shaft 19 is an arm 20, Figs. 1 and 6, whose free end bears against a cam-sleeve 21, slidable upon the driving-shaft 1, or rather, in the present instance, upon the hub 5, of the cylinder 3, which is secured upon that shaft. The said sleeve has a high portion 22 and a tapering low portion 23. When the arm 20 rides upon the lower or inclined portion of the sleeve, the friction-ring 15 (as also the ring 11) will be in the normal or contracted position; but when said arm rides upon the highest portion of the sleeve, as in the drawings, the cam 18 is rotated to the position to force farther apart the free ends of the ring 15—that is, to expand the latter, thereby also expanding that ring against the inner periphery of the cylinder 3. It will thus be seen that the extent of expansion and contraction of the said rings is governed by the position of the cam-sleeve.

In order to adjust the position of the cam 18 without changing the extent of its movement, I make the contact-point of the arm 20 against sleeve 21 the end of an adjustable screw 24, that is secured to said arm. As a convenient means for shifting the said cam-sleeve I employ a yoke 25, that is entered into a circumferential groove 26 of the sleeve, the free end of the arm 27 of the yoke being in the present instance fixed to a longitudinally-slidable horizontal bar or rod 28, (hereinafter again referred to,) which is supported by standards 29, that are secured to the floor or other fixed support.

Encircling the rim of the wheel 9, that carries the series of bevel-gears 7, is a friction-strap 30, of elastic steel or other suitable material. One of the free ends 31 of this strap is firmly held by or secured to a standard 32, that rises from the floor or other fixed support. As a convenient means for thus holding this end of the strap I bend one end of the same outwardly to form a projection 33, that rests upon or is secured to a ledge 34 of said standard. The other or upper end of the strap is also bent outwardly to form a projection 35. Pivoted to the upper end of the standard 32 above this latter projection is a bell-crank cam-lever 36, having a vertical arm 37 and a horizontal arm 38 and having also a cam or curvilinear enlargement 39, that is adapted to bear against the said projection 35 of the strap 30. On the outer end of the horizontal arm of said cam-lever is a depending limb 40, having a slot 41, one portion 42 of which is inclined to said arm 38, and the remaining portion 43 is substantially concentric with the pivot upon which the cam-lever 36 is adapted to turn, all as clearly seen in Fig. 2, reference being had also to Figs. 1 and 7. Projecting into the slot 41 is a pin or stud 44, Figs. 1 and 2, that is secured to the before-mentioned rod or bar 29, to which the arm of yoke 25, engaging the slidable cam-sleeve 21, is fixed, as previously described.

In order to insure the retention of the strap 30 in suitable position on the rim of wheel 8, the strap is seated in a peripheral groove 45, Fig. 1, of the latter.

Having now described the construction of my invention, I proceed to explain the mode of operation thereof, as follows, premising that the position of the parts shown in the drawings is that occupied by them when the tail-shaft 2 is being driven in the same direction as that of the driving-shaft 1: At this time the arm 20 is riding upon the high portion of the cam-sleeve 21, and consequently the inner friction-ring 15 is expanded against the outer friction-ring 11, and thus the latter is in close frictional contact with the cylinder 3. The arm 37 of lever 36 is in the vertical position, and thus the strap 30 does not hug the rim of wheel 9. Consequently the wheel is free to rotate upon the tail-shaft 2, and as it (the tail-shaft) is, so to say, then locked with the driving-shaft and the bevel-gears 7 rotate on their radial shafts by their connection with the gear 6 on cylinder 3 the wheel 9 rotates without driving the gear 10. When it is desired that the tail-shaft be not driven while the driving-shaft is rotating, the lever 36 is rotated on its pivot in a manner to bring the cam-slot 41 of the lever-arm 37 to a position where the stud 44 of bar 28 is at or near the lower end of the inclined part 42 of the slot. This movement of said lever forces back bar 28, and consequently slides back the cam-sleeve 21 to the position in which the arm 20 rides upon the low portion of the sleeve, thereby rotating the cam 18 to the position to release the inner friction-ring 15, and consequently the outer ring 11, these rings then contracting by their elasticity. Thus the cylinder 3—in effect, the shaft 1—cannot drive the tail-shaft, there being then no operative connection between the latter and the said cylinder—i. e., the driving-shaft—and the wheel 9 will rotate on the tail-shaft, as before. If now it be required to drive the tail-shaft in a direction reverse to that of the driving-shaft, the lever 36 is further rotated in the same direction until the cam portion 39 thereof bearing down upon the projection 35 of the strap 30 causes the latter to hug the rim of wheel 9, and thus to prevent the latter from rotating upon the tail-shaft. Consequently the rotation of the bevel-gears 7 on their shafts 8 will be transmitted to the gear 10, fixed to the tail-shaft, thereby obviously rotating the latter in the opposite direction to that of the cylinder 3, and therefore of the driving-shaft.

By the use of the split friction-rings and means for expanding the same, as described, I am enabled to start the movements of the tail-shaft gradually, thus avoiding any shock or sudden strain. As a means for minimizing the friction between the tail-shaft and the wheel 9 I employ a roller-bearing 45, Fig. 1, between the hub of the latter and said shaft. For a like purpose I use a similar bearing 46 between the wall of the tubular extension 4 of the hub of the cylinder 3 and said tail-shaft.

I remark that while I have shown and described that form of my invention in detail which at the present time I consider to be preferable the same may be changed within limits by one skilled in the art to which the invention pertains without departing from the essential construction and mode of operation thereof. For example, the expansion-ring 12 may be dispensed with and a similar ring (not an expansion-ring) out of contact with the cylinder substituted therefor, the latter ring being fixed to the spider 13 or the like and the necessary friction secured by expanding the ring 15 against said fixed ring. In such case the cylinder 3 would serve only as a frame or support for carrying the bevel-gears 6 and other parts hereinbefore described, including the expansion-ring 15, the object of using the outer expansible and contractible friction-ring 12 and also of having the part of said frame or support with which said ring is adapted to contact cylindrical being only to secure increased friction for driving the tail-shaft in the same direction as that of the driving-shaft.

Having thus described my invention, I claim as new and desire to secure by Letters Patent—

1. The combination of the driving-shaft, the expansion-ring carried thereby, the tail-shaft, an outer ring carried thereby, means for causing said expansion-ring to frictionally engage said outer ring when required, the bevel-gear carried by said driving-shaft, the wheel rotatably mounted upon said tail-shaft, the bevel-gears radially journaled on said wheel, and engaging the first-mentioned gear, the bevel-gear fixed to the tail-shaft, with which gear the bevel-gears of said wheel engage, and means for preventing the rotation of said wheel on said tail-shaft, when required, substantially as and for the purpose set forth.

2. The combination of the driving-shaft, the hollow cylinder secured thereto, the bevel-gear mounted upon said cylinder, the tail-shaft, the wheel rotatively mounted upon the latter, the bevel-gears radially journaled on said wheel and engaging the first-mentioned gear, the bevel-gear fixed upon the tail-shaft, with which gear the bevel-gears of said wheel engage, the outer expansible and contractible friction-ring, within said cylinder, and carried by the tail-shaft, the similar inner friction-ring within said cylinder and connected with the driving-shaft, so as to rotate therewith, means for expanding and contracting said inner friction-ring with relation to said outer ring, and means for preventing rotation of said wheel on the tail-shaft, when required, substantially as and for the purpose set forth.

3. The combination of the driving-shaft, the hollow cylinder secured thereto, the bevel-gear mounted upon said cylinder, the tail-shaft, the wheel rotatively mounted upon the latter, the bevel-gears radially journaled on said wheel and engaging the first-mentioned gear, the bevel-gear fixed upon the tail-shaft with which gear the gears on said wheel engage, the elastic expansible and contractible friction-ring within said cylinder and connected with said tail-shaft and rotatable therewith, the similar inner friction-ring connected with and carried by said driving-shaft, means for causing the said inner friction-ring to expand into frictional contact with said first-mentioned ring, and to permit the same to contract out of such frictional contact, and means for preventing the rotation of said wheel when required, substantially as and for the purpose set forth.

4. The combination of the driving-shaft, the elastic, split, expansion-ring carried thereby, the tail-shaft, an outer ring carried thereby, the bevel-gear carried by said driving-shaft, the bevel-gear fixed to said tail-shaft, the wheel rotatively mounted on said tail-shaft, the bevel-gears engaging said gears of the driving and tail shafts respectively, and means for causing the said expansion-ring to expand into frictional contact with said outer ring and to permit the same to contract out of such frictional contact, together with means for preventing the rotation of said wheel when required, substantially as and for the purpose set forth.

5. The combination of the driving-shaft, the hollow cylinder fixed thereto, the bevel-gear mounted upon said cylinder, the tail-shaft, the bevel-gear fixed thereto, the wheel rotatively mounted on said tail-shaft, the bevel-gears radially journaled on said wheel, and engaging the other two mentioned gears, the expansible and contractible friction-ring within and contiguous to the inner periphery of said cylinder, and connected with and carried by the tail-shaft, the inner elastic split friction-ring connected to and rotatable with said cylinder, the cam journaled to and within the latter and adapted to expand and permit the contraction of the last-mentioned ring, the sleeve having the higher and lower portions, and slidably mounted on said driving-shaft, the arm connected to said cam, and adapted to bear upon said sleeve, the friction-strap encircling the said wheel, and means for bringing the same into and out of frictional contact with said wheel, substantially as and for the purpose set forth.

6. The combination of the driving-shaft, the hollow cylinder fixed thereto, the tail-shaft, the bevel-gear mounted on said cylinder, the wheel rotatably mounted upon said tail-shaft, the bevel-gear fixed to the latter, the bevel-gears radially journaled to said wheel and engaging said two other bevel-gears, the expansible and contractible ring, contiguous to the inner periphery of said cylinder, and connected to said tail-shaft so as to rotate therewith, the inner friction-ring, contiguous to said outer ring and connected to said cylinder, means for expanding and contracting said inner friction-ring, means for holding said wheel to prevent rotation thereof on the tail-shaft, and for releasing the same, and mechanism connecting said two means for simultaneously causing the first-mentioned means to contract said inner friction-ring and the second-mentioned means to operate to prevent the rotation of said wheel, and to simultaneously expand said ring, and permit the said wheel to rotate, substantially as and for the purpose set forth.

7. The combination of the driving-shaft, the hollow cylinder fixed thereto, the tail-shaft, the bevel-gear mounted on said cylinder, the wheel rotatably mounted upon said tail-shaft, the bevel-gear fixed to the latter, the bevel-gears radially journaled to said wheel, and engaging said two other gears, the expansible and contractible friction-ring, contiguous to the inner periphery of said cylinder, and connected to said tail-shaft so as to be rotatable therewith, the inner elastic split ring contiguous to said outer ring and connected to and rotatable with said cylinder, the cam between the free ends of said inner ring, and journaled to said cylinder, the slidable cam-sleeve upon the driving-shaft, having the high and low portions, the arm connected to the journal of said cam and adapted to bear upon said sleeve, the yoke, connected to the latter, the movable bar to which said yoke is secured, the elastic friction-strap encircling said wheel, the pivoted cam-lever connected to said bar and adapted when thrown in one position to simultaneously bring said strap into frictional contact with said wheel, and to retract said sleeve with relation to said arm connected to the said inner ring-cam, and thereby permit said ring to contract, and the converse, when said lever is thrown to another position, substantially as and for the purpose set forth.

8. In a shaft-reversing mechanism, the following elements in combination, to wit: the driving-shaft, the hollow cylinder secured thereto, the tail-shaft, the bevel-gear fixed to said cylinder, the bevel-gear fixed to said tail-shaft, the rimmed wheel rotatable upon said tail-shaft, and having the series of radial spokes or shafts, the bevel-gears rotatably mounted upon said shafts respectively, and engaging said other two gears, the spider secured to the tail-shaft, the outer expansible and contractible friction-ring carried by said spider, and contiguous to the inner periphery of said cylinder, the inner expansible and contractible friction-ring, carried by said cylinder, and contiguous to said outer friction-ring, a cam adapted to expand and to permit the contraction of said inner ring, the slidable cam-sleeve upon said driving-shaft, having the high and low portions, the arm connected to said cam and adapted to bear upon said sleeve, the yoke connected to the latter, the slidable bar to which said sleeve is secured, the friction-strap encircling the said wheel, the fixed support to which one end of said strap is secured, the bell-crank lever pivoted to said support, one arm of which lever has a cam portion adapted to bear against the free end of said strap, and the other arm of said lever is provided with an inclined slot, the stud carried by said bar and entered into said slot, all constructed and adapted to operate substantially as and for the purpose set forth.

In testimony whereof I have hereunto affixed my signature this 16th day of March, A. D. 1903.

JOHN S. SHEPPARD.

Witnesses:
JOHN M. CAMPBELL,
WALTER C. PUSEY.